United States Patent [19]

Garratt et al.

[11] 3,826,983

[45] July 30, 1974

[54] DIGITALLY SCALED DIGITAL VOLTMETER

[75] Inventors: Philip M. Garratt, Amsterdam; Charles W. Eichelberger, Schenectady, both of N.Y.

[73] Assignee: General Electric Company, Schenectady, N.Y.

[22] Filed: Apr. 2, 1973

[21] Appl. No.: 347,137

[52] U.S. Cl. .......................... 324/99 D, 340/347 NT

[51] Int. Cl. ....................... G01r 17/06, H03k 13/10

[58] Field of Search.... 324/99 D, 111; 340/347 AD, 340/347 NT

[56] References Cited

UNITED STATES PATENTS

| | | | |
|---|---|---|---|
| 2,836,356 | 5/1958 | Forrest et al. | 324/99 D |
| 3,316,547 | 4/1967 | Ammann | 324/99 D |
| 3,566,397 | 2/1971 | Walton | 340/347 AD |
| 3,623,073 | 11/1971 | Wheable et al. | 340/347 AD |

*Primary Examiner*—Alfred E. Smith
*Assistant Examiner*—Ernest F. Karlsen
*Attorney, Agent, or Firm*—Louis A. Moucha; Joseph T. Cohen; Jerome C. Squillaro

[57] ABSTRACT

An up-down integrator is connected by means of control logic to a preset counter in an up-integration period wherein the count set in the preset counter determines the full scale on the voltmeter. An input D.C. voltage signal having a magnitude proportional to an analog quantity measured by the voltmeter is supplied to the input of the integrator during the up-integration process. Upon the counter reaching the preset count of clock pulses supplied thereto, the control logic removes the input signal from the integrator and switches a fixed D.C. reference voltage thereto during a down-integration period. During the down-integration process, a second counter counts the clock pulses and when the integrator output voltage reaches zero, a threshold circuit at the output of the integrator detects the zero crossover and the control logic removes the reference input from the integrator and connects it to ground as well as transferring the final count output of the second counter to a display which indicates this final count that represents the magnitude of the measured quantity.

30 Claims, 6 Drawing Figures

DIGITALLY SCALED DIGITAL VOLTMETER

Our invention relates to a digital type voltmeter, and in particular, to a voltmeter which is digitally scaleable and readily adapted to provide a remote indication of an analog quantity being measured by the voltmeter with the use of only two connections to the remote indicator.

Digital type voltmeters find use in many applications to display various physical quantities such as pressure in pounds per square inch and rotating speed in revolutions per minute as two examples. The prior art digital voltmeters include an up-down integrator and pulse counter and associated logic circuitry such that during an input period wherein the signal to be measured is supplied to the input of the integrator, the counter counts clock pulses generated in an oscillator and at the time of counter overflow, the input to the integrator is disconnected from the input signal and is connected to a reference voltage of opposite polarity which causes the down integration process. Equating the magnitude of the reference voltage to the input signal voltage results in the scaling of the voltmeter such that full scale is equal to a selected magnitude of the quantity being measured. In a measurement of the input signal having a magnitude less than full scale, the integrator integrates upward at a slower rate and reverses its integration after the same number of counts as for full scale, but at a lower voltage level, such that the final count upon the integrator reaching zero minus the number of counts during the input period is a measure of the magnitude of the input voltage signal. For many applications, a remote readout of the digital voltmeter is necessary due to the environment in which the measurements are made, and the prior art digital voltmeters require four conductors for each decade counter used for interconnecting the remote indicator with the locally located components of the voltmeter. Since the counter generally includes at least four decades, it is obvious that a great number of interconnecting conductors are required which add to the complexity and cost of such prior art remote indicator feature. Finally, the prior art digital voltmeters are not readily scaleable and utilize complex and attendant expensive circuitry for obtaining the scaleable feature.

Therefore, one of the principal objects of our invention is to provide an improved digital voltmeter which is easily scaleable and utilizes simple circuitry.

Another object of our invention is to provide digital scaling and digital vernier of the voltmeter.

A further object of our invention is to provide the voltmeter with remote indicator capability utilizing a minimum complexity and requiring only two interconnections.

A still further object of our invention is to provide the digital voltmeter with automatic zero compensation.

Briefly stated, and in accordance with the objects of our invention, we provide a scaleable digital voltmeter which includes an input switch device for providing an input to the voltmeter having a first input connected to a source providing an input D.C. voltage signal having a magnitude proportional to a D.C. analog quantity to be measured, a second input connected to a source of fixed reference voltage of polarity opposite to that of the input signal and a third input connected to ground. A control logic circuit initiates operation of the voltmeter by activating the first input of the input switch device and causing an integrator connected to the output of the switch device to integrate in an up direction as a function of the input signal. A first counter has a selected count preset therein which corresponds to full scale on the voltmeter. A first input of the counter is connected to an output of an oscillator which generates clock pulses at a constant repetition rate, and a second input is connected to a second output of the control logic circuit for initiating the counting of the clock pulses in the first counter simultaneously with the application of the input signal. The output of the first counter is connected to a second input of the control logic for applying a signal thereto simultaneously with the clock pulse count reaching the preset value which signal results in resetting the first counter to zero. The control logic circuit has a third output which activates the second input of input switch device and deactivates the first input to thereby connect the reference voltage source to the integrator to cause integration in the down direction. A second counter has a first input connected to the output of the oscillator and a second input connected to a fourth output of the control logic for causing the application of the reference voltage to the integrator to simultaneously initiate the counting of the clock pulses in the second counter. A display means is connected to the output of the second counter and has a second input connected to the fourth output of the control logic. A threshold circuit connected to the output of the integrator senses the integrator output voltage passing through zero and a signal is generated in the control logic in response thereto to cause the control logic to provide an enable signal at the fourth output thereof for enabling the display means so as to display the count of the second counter occurring when the threshold circuit detects the integrator output zero. The count displayed from the second counter represents the magnitude of the measured quantity and the control logic at such time activates the grounded input of the input switch device so as to maintain the input of the integrator at zero for achieving a zero state with the voltmeter in preparation for a subsequent measurement.

Only two conductors are necessary for interconnecting the second counter and display means, when remotely located, with the remainder of the voltmeter, namely, the connection to the oscillator and to the fourth output of the control logic circuit.

The features of our invention which we desire to protect herein are pointed out with particularity in the appended claims. The invention itself, however, both as to its organization and method of operation together with further objects and advantages thereof may best be understood by reference to the following description taken in connection with the accompanying drawings wherein like parts in each of the several figures are identified by the same reference character, and wherein:

Figure 1:
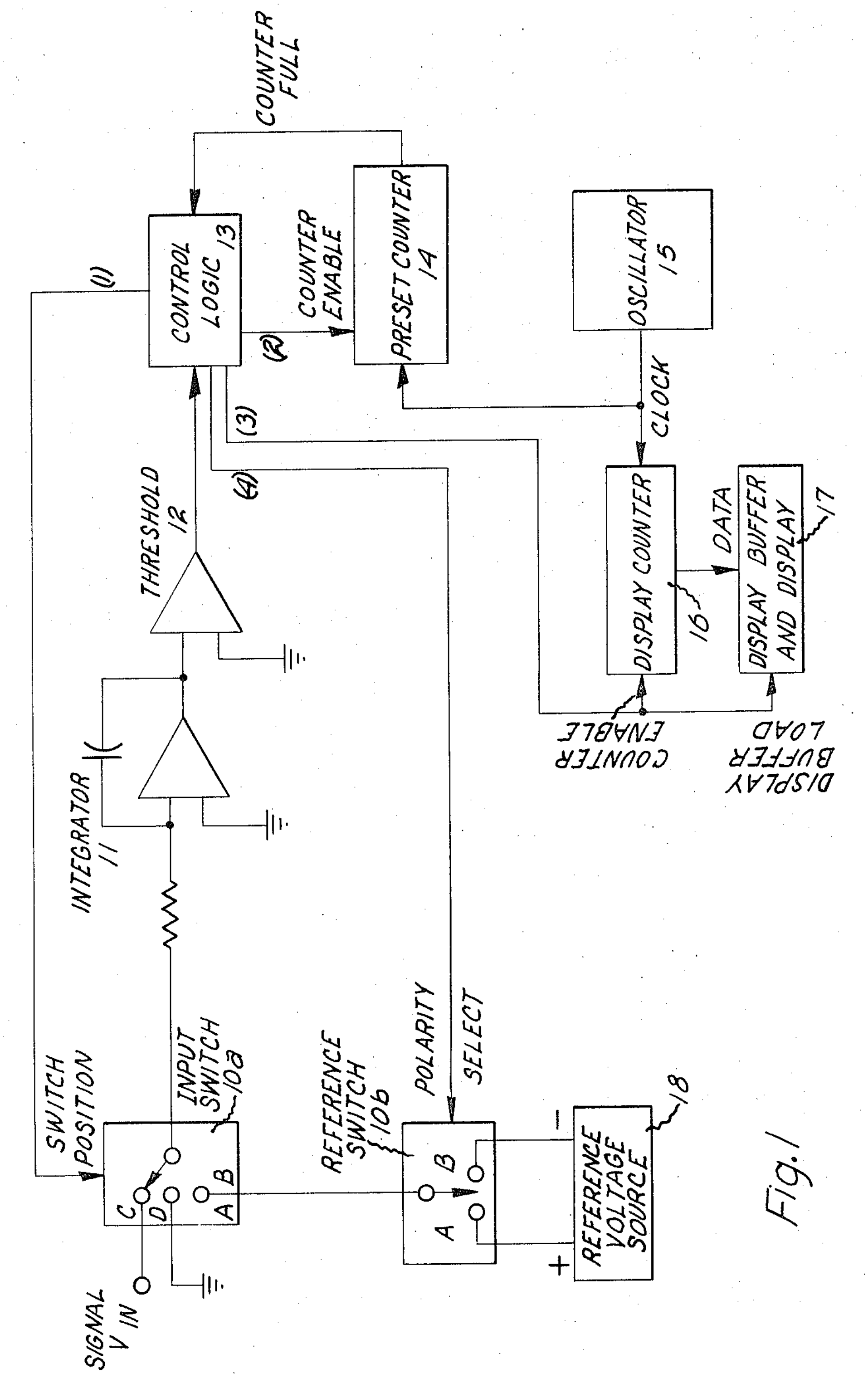
FIG. 1 is a general block diagram, partly in schematic form, illustrating the major components of our digital voltmeter.

Referring now to FIG. 1, there are shown the basic components of our scaleable digital voltmeter which is scaleable by a digital technique. The basic components are of the electronic type readily fabricated as integrated circuits and consist of an input switch means 10a, an integrator 11 connected to the output of the switch means 10a, a threshold circuit 12 connected to the output of integrator 11, a control logic circuit 13 having a first input connected to the output of threshold circuit 12 and a second input connected to the output of a preset counter 14. A first output (1) of control logic 13 is adapted to sequentially provide three different signals which control the state of the input switch means 10. A second output (2) of control logic 13 enables and subsequently resets preset counter 14. An oscillator 15 functions as a clock generator for generating clock pulses at a constant repetition rate which are first counted by the preset counter 14 during its enabled state when integrator 11 is integrating in the "up" direction from zero in response to switch 10*a* being activated into its "signal" input state. It should be understood that the "up" and "down" directions described herein have no algebraic significance, the "up" direction implying away from zero, and the "down" direction implying toward zero. The clock pulses are subsequently counted by a second counter designated "display" counter 16 which is enabled from a third output (3) of control logic 13 to count during the interval that integrator 11 is integrating in the "down" direction toward zero in response to switch 10a being activated into its "reference" input state. The "data" output of display counter 16 is supplied to a display means 17 which includes a display buffer that is loaded with the counter 16 data at the time the integrator output reaches zero and an appropriate display that is enabled from the same third output (3) of control logic 13 to display such count. Since the signal input voltage $V_{in}$, which has a magnitude proportional to the D.C. analog quantity to be measured by the voltmeter, may in many cases be of positive or negative polarity, a fourth output (4) of the control logic circuit 13 is connected to a reference switch means 10*b* which selects the correct polarity of a reference voltage supplied to the input switch means 10*a* from a stable precision reference voltage source 18. The hereinabove mentioned components of our digital voltmeter will be described in greater detail with reference to the schematic diagrams of FIGS. 3, 4 and 5 but by way of initially describing our invention in more general terms, the operation of our voltmeter with reference to the schematic-block diagram of FIG. 1 and waveforms of FIG. 2 will now be described in some detail.

Figures 2, 2A, 2B, 2C, 2D:
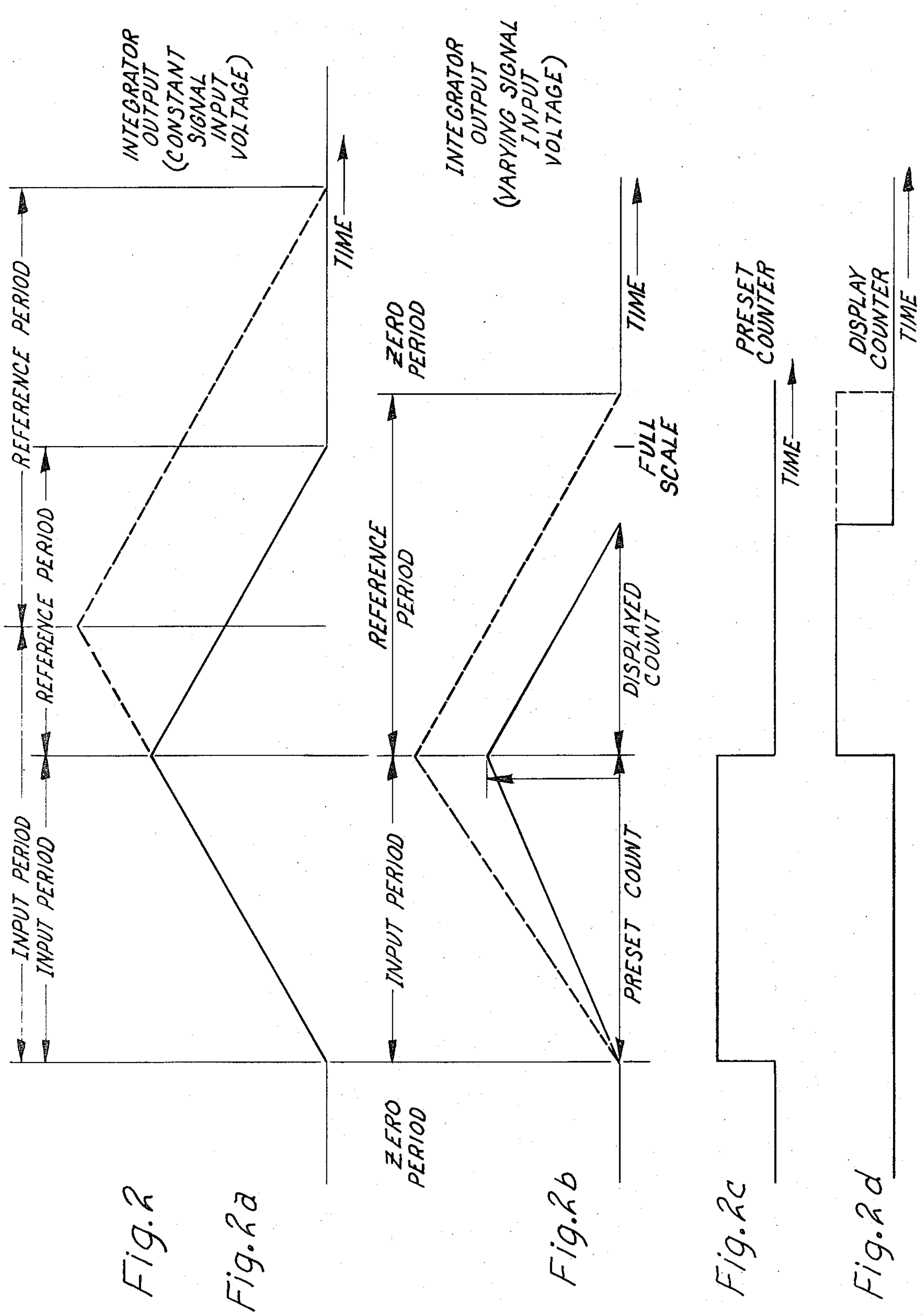
FIG. 2 is a series of voltage waveforms versus time illustrating the operation of the integrator and counter components of our digital voltmeter during the digital scaling process as well as during a measurement process.

The full scale of our voltmeter is determined as follows. Initially, the integrator output voltage is zero. Following this period, input switch 10*a* is activated into the "C" position state and the input signal voltage $V_{in}$ is adjusted to in magnitude the voltage value desired to produce full scale on the voltmeter. For example, a voltage of 10 volts may be desired to provide a full scale voltmeter reading of 3,600. Assume also that the reference voltage has this same magnitude. During this INPUT PERIOD the input signal voltage $V_{in}$ is applied to integrator 11 through position C of switch 10*a* to cause the integrator to integrate in an up (from zero) direction as shown in FIG. 2*a*. Upon reaching the selected clock pulse count of 3,600 which was preset on preset counter 14, and which corresponds to a peak output of integrator 11, a "counter-full" signal from counter 14 is applied to control logic 13 which develops the second signal at the first output thereof for activating the input switch 10*a* from the C position state to the A or B position state. A "polarity select" signal developed at the fourth output of control logic 13 activates the reference switch 10*b* into the A or B position state in order to apply a reference voltage to integrator 11 of polarity opposite that of the input signal voltage $V_{in}$. The reference voltage being of opposite polarity to the input signal voltage, and of the same magnitude, integrator 11 integrates in a down direction towards zero during the REFERENCE PERIOD at the same rate as in the INPUT PERIOD. During this REFERENCE PERIOD, which is equal in time duration to the INPUT PERIOD, the preset counter 14 is disabled by an appropriate signal from control logic 13 at the second output thereof, and display counter 16 is enabled from the third output of the control logic and counts the pulses generated by oscillator 15. Upon the integrator 11 output reaching zero voltage, the threshold circuit 12 detects the integrator output zero crossing and control logic 13 generates a pulse in response thereto which is provided at the third output thereof for disabling display counter 16 and transferring the final count thereof to the display buffer. Since the reference voltage is equal to the input signal voltage during this scaling procedure, the final count on display counter 16 will be the 3,600 count on preset counter 14. Upon the display buffer being loaded with the count from counter 16, it transfers the final count to the particular display component being utilized. Preset counter 14 had previously been reset immediately after being disabled and display counter 16 is preferably automatically reset after being disabled. The various components in our voltmeter are now again at their zero or initial condition and the voltmeter is in the state where it is adapted to perform the required voltage measurements.

As stated above, and with specific reference to FIG. 2*a*, the initial scaling procedure described hereinabove requires that the input signal voltage and reference voltage *b* equal in magnitude and thus results in the INPUT PERIOD and REFERENCE PERIOD being equal in time duration, which is to say that the display count on display counter 16 is equal to the preset count on preset counter 14. It is assumed that the integrator output voltage follows the solid lines indicated in FIG. 2*a* for a full scale count of 3,600. If the voltmeter is desired to be scaled such that the 10 volt input will result in a displayed count of 5,000, then such 5,000 count is preset on counter 14 and the voltmeter is operated through the same procedure enumerated above except that now integrator 11 integrates at the same rate in an up direction to a higher output voltage as indicated by the dashed continuation of the solid line in FIG. 2*a*. Upon reaching the preset count of 5,000, integrator 11 integrates downward toward zero as shown by the dashed line. Again the INPUT PERIOD is equal to the REFERENCE PERIOD and each is proportionally longer in time duration than in the case of the full scale count of 3,600.

After our voltmeter has been scaled, and assuming an input of 10 volts to the meter will result in a displayed reading of 3,600, the meter can be utilized for its measurement of an input D.C. voltage signal having a magnitude proportional to a D.C. analog quantity to be measured. Thus, with reference to FIG. 2*b*, and assuming a scaling of 3,600 for 10 volts input, an input signal of 7.5 volts to the meter causes the integrator output voltage to follow the solid line having a slope in the INPUT PERIOD which is less than the slope in the corresponding INPUT PERIOD in the scaling procedure of FIG. 2*a*. After reaching the preset count of 3,600, the integrator integrates downward during the REFERENCE PERIOD with the same slope as in the scaling procedure. As a result, the display count of 2,700 which has accumulated in display counter 16 is less than the preset count due to the peak integrator output voltage (indicated by the vertical arrow) not having risen to the value achieved in the scaling procedure illustrated in FIG. 2*a*. In the case wherein the D.C. analog quantity being measured by the voltmeter exceeds the full scale reading, resulting in signal input voltage $V_{in}$ being greater than the assumed nominal 10 volt full scale, integrator 11 integrates upward at a steeper slope as depicted by the dashed line in FIG. 2*b* than the slope for full scale depicted in FIG. 2*a*. The integrator output voltage thus reaches a higher magnitude at the end of the INPUT PERIOD. Due to the same reference voltage being employed, the slope of the integrator output voltage is always the same during the REFERENCE PERIOD and thus the displayed count exceeds full scale as indicated by the dashed integrator voltage line in FIG. 2*b*. This over-range capability is essential for a voltmeter since the measured quantity may on occasion exceed the nominal (full scale) value, such as in overspeed or overpressure applications.

FIG. 2*c* indicates the operation of preset counter 14 in that during the INPUT PERIOD the preset counter output is high to indicate that it is counting, and at the time of reaching the preset count, the counter output goes low (is disabled) and remains in the low state until such counter begins its next count cycle in the next INPUT PERIOD. FIG. 2*d* illustrates the operation of display counter 16 that it remains in its low state during the INPUT PERIOD and upon the preset count being reached by counter 14, the display counter 16 is switched to its high state (enabled) and begins counting and continues counting for the duration of the REFERENCE PERIOD. At the end of the REFERENCE PERIOD, the output of display counter 16 again switches to its low state and remains in such low state until the following REFERENCE PERIOD. The dashed extension of the high state of the display counter in FIG. 2*d* is associated with the longer REFERENCE PERIOD in FIG. 2*b*. Thus, it is evident that the display count is determined by the formula: DISPLAYED COUNT = INPUT VOLTAGE/REFERENCE VOLTAGE × (PRESET COUNT). Thus, the adjustment of preset counter 14 is used to digitally scale the displayed count, and this simple procedure results in our digital voltmeter being scaleable by a much simpler procedure than used for conventional digital voltmeters. As evident in the formula, the scaling capability of the preset counter can also accommodate a reference voltage that is not equal to the full scale (signal) input voltage. The voltages are assumed equal in the previous references to FIG. 2*a* in order to simplify the description of circuit operation. If the voltages are not equal, the preset count will not be the same as the displayed full scale count, but scale adjustment can nevertheless be easily accomplished by a simple sequential procedure.

A significant advantage of this technique is that the reference need not be an exact voltage but only needs to be highly stable. All conventional digital voltmeters require adjustment of the reference voltage. Our invention eliminates this requirement, and results in simpler circuits for the reference circuits, providing improved stability at lower cost.

Figure 3:
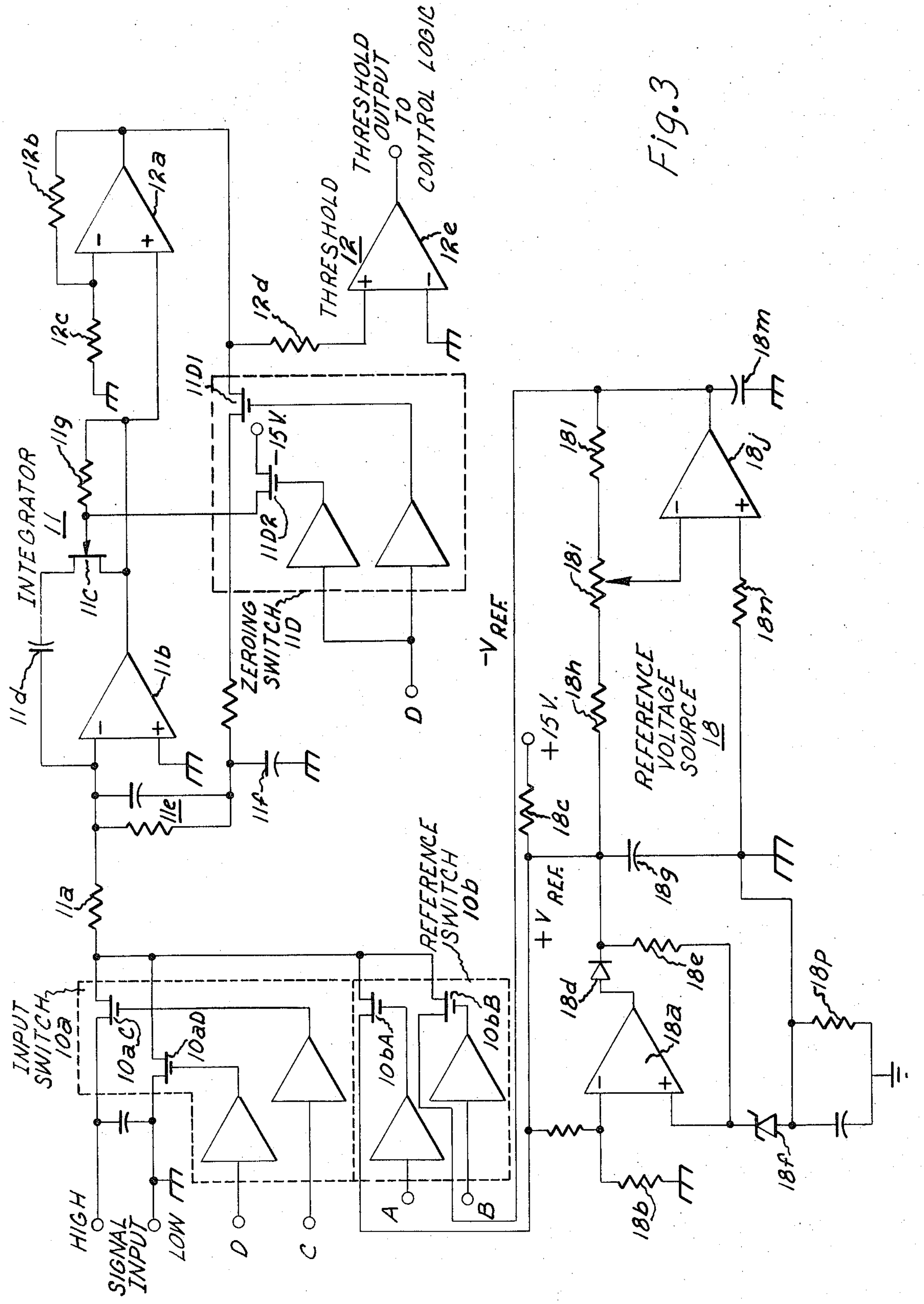
FIG. 3 is a schematic diagram of the input switch, reference, integrator and threshold circuits shown generally in FIG. 1.

Referring now to FIG. 3, there is shown in schematic form the input and reference switch means 10*a*, 1*b*, integrator 11, threshold circuit 12, reference voltage source 18, and a zeroing switch means 11D. The input, reference and zeroing switch means are hybrid analog dual single-pole single-throw fast acting switches operated by flip-flops F1, F2 and one-shot multivibrator T1 (in the control logic of FIG. 4) in accordance with the logic table set forth in FIGS. 4 and 6. Each hybrid analog switch 10*a*, 10*b* and 11D is fabricated as a switch package which as one example may be of the type AHO134CD manufactured by National Semiconductor Corporation, and includes two J-FET transistors having their gate electrodes connected to outputs of drivers which have their inputs connected through suitable conventional logic (not shown) to terminals designated A, B, C or D corresponding to FIG. 1. The A, B, C, D terminals in FIG. 3 are connected to like terminals in the control logic circuit 13 shown in detail in FIG. 4. Obviously, MOSFET or other type transistor switches could be used in place of the J-FET, the criteria being that they be fast acting and have low resistance when conducting. J-FETS 10*a*C and 10*a*D in input switch 10*a* are associated with terminals C and D, respectively, while J-FETs 10*b*A and 10*b*B are associated with terminals A and B. The source electrode of J-FET 10*a*C is connected to the HIGH signal input terminal of our voltmeter and the source electrode of the J-FET 10*a*D is connected to the LOW or ground input terminal. The source electrodes of J-FETs 10*b*A and 10*b*B are respectively connected to the $+V_{ref}$ and $-V_{ref}$ outputs of reference voltage source 18.

The drain electrodes of J-FETs 10*a*C, 10*a*D, 10*b*A and 10*b*B are connected together at the input end of a resistor 11*a* whose output end is connected to the negative polarity input of an operational amplifier 11*b* connected as an integrator. The power supply by-pass capacitors and voltage power supply connections for amplifier 11*b*, as well as for all of the other hereinafter disclosed active devices, are not illustrated herein for purposes of simplification. The output of amplifier 11*b* is connected through a low leakage switch 11*c* to the integrator capacitor 11*d* which is connected in negative feedback relationship to the negative input of amplifier 11*b*. The integrator resistor-capacitor time constant is determined by the resistance value of input resistor 11*a* and the capacitance of feedback capacitor 11*d*. Switch 11*c* must be of a high precision type in order to open the capacitor feedback circuit around amplifier 11*b* precisely when the integrator output voltage has gone through zero as a result of the down integration process. As one example, switch 11*c* may be an N-channel FET transistor having the source electrode connected to the output of amplifier 11*b*, the drain electrode connected to capacitor 11*d* and the gate electrode connected to the drain electrode of transistor switch 11D2 which has its source electrode connected to a −15 volts supply. The gate electrode of switch 11*c* is also connected through a resistor 11*g* to the output of amplifier 11*b* which is connected to the positive polarity input of a high gain amplifier 12*a*. The negative polarity input of amplifier 11*b* is also connected through a parallel resistor-capacitor stabilizing lead network 11*e* to a grounded null capacitor 11*f* utilized in the automatic zeroing circuit to be described hereinafter. The juncture of stabilizing network 11*e* and capacitor 11*f* is connected through a resistor to the drain electrode of J-FET 11D1 in the zeroing switch means 11D. The output of amplifier 12a (which is also an operational amplifier) is connected through a resistor 12*b* to the negative input thereof and a second resistor 12*c* is connected from the negative input to ground. Resistors 12*b* and 12*c* determine the forward gain of the non-inverting amplifier 12*a* which is approximately 50 in the particular embodiment described herein. The output of amplifier 12*a* is connected to the source electrode of transistor switch 11D1 and the function of the 11D1 and 11D2 switches will be described hereinafter with reference to the operation of the automatic zeroing circuit. The output of amplifier 12*a* is also connected through a resistor 12*d* to the positive polarity input of a voltage comparator 12*e* which functions as the threshold detector for detecting the output of integrator 11*b* passing through zero after the down-integration process. The output of comparator 12*e* is connected to two inputs of the control logic 13 as will be described with reference to FIG. 4.

The circuits illustrated in FIG. 3 are of the analog type, and their operation may now be described with only a general reference to the operation of the control logic 13 and other digital circuits. A cycle of operation begins with the preset counter 14 being enabled and input switch 10*a*C being activated (into its conducting or closed state) to thereby apply the input signal to the input of integrator 11*b*. Integrator 11*b* integrates the input signal $V_{in}$ in the "up" direction for a time duration of the INPUT PERIOD controlled by the preset counter 14. At the time that counter 14 has counted the preset number of clock pulses, the "counter full" pulse clocks the input signal polarity information from the output of comparator 12*e* into a polarity flip-flop F2 and simultaneously resets a control flip-flop F1 in control logic 13 which disables counter 14 and resets it, deactivates switch 10*a*C and activates reference switch 10*b*A or 10*b*B depending on the polarity of the input signal. At this time the INPUT PERIOD has ended and the REFERENCE PERIOD begins since the particular polarity reference voltage $V_{ref}$ selected by switch 10*b*A or 10*b*B is now applied to the input of integrator 11 for the "down" integration period. During this REFERENCE PERIOD, display counter 16 is enabled and counting the clock pulses. At the end of the REFERENCE PERIOD when the comparator 12*e* input voltage passes through zero and causes the comparator output voltage to switch states, a pulse is generated in a trigger circuit in control logic 13 for triggering a null timer one-shot multivibrator T1 which disables counter 16, deactivates reference switch 10*b*A or 10*b*B and activates switch D which includes input switch 10*a*D and zeroing switches 11D1 and 11D2 to thereby begin the ZERO PERIOD. Swith 10*a*D grounds the input to integrator 11, switch 11D2 disconnects the integrator capacitor 11d by applying −15 volts to the gate electrode of FET switch 11*c* which switches it to its nonconductive state, and switch 11D1 enables a nulling or automatic zeroing circuit wherein the output of amplifier 12*a* is supplied to null capacitor 11*f* for establishing a voltage thereon to compensate for any input offset of amplifier 11*b*. The gain of the null loop is sufficiently high (preferably greater than $10^6$) so that any remaining differential input to amplifier 11 to support the null capacitor voltage is negligible. When null timer T1 times out, switch D is deactivated leaving null capacitor 11*f* charged. The time constant of the resistor 11*e* — capacitor 11f network is sufficiently high so that the null voltage does not significantly leak off capacitor 11*f* during the following INPUT and REFERENCE PERIODS. When null timer T1 times out it also activates input switch 10*a*C since control flip-flop F1 is still set, and the INPUT PERIOD-REFERENCE PERIOD-ZERO PERIOD cycle repeats.

The reference voltage source 18 may be any highly stable voltage source, but for the particular herein described embodiment of our scaleable digital voltmeter, we have developed a new highly stable precision voltage source which will be described hereinafter, and, since it has many other applications, it is described and claimed in our concurrently filed application Ser. No. 347,239, entitled "Highly Stable Precision Voltage Source". The reference voltage source includes a first operational amplifier 18*a* having a resistor 18b connected from the negative input terminal of amplifier 18*a* to ground. A resistor 18*c* is connected around amplifier 18*a* to the negative input terminal thereof from the cathode of a diode 18*d* having its anode connected to the output of amplifier 18*a*. Amplifier 18*a* is a non-inverting type and its gain is determined by the ratio of resistors 18*b* plus 18*c* to 18*b*. The juncture of resistor 18*c* and diode 18*d* is connected through a resistor 18*c* and diode 18*d* is connected through a resistor 18*e* to the positive input terminal of amplifier 18*a* and to a zener diode 18*f* whose anode is grounded. Finally a resistor 18o is connected from the juncture of diode 18*d* and resistor 18*e* to the +15 volt power supply for driving such juncture positive to initiate conduction of amplifier 18*a*, and secondarily to supply some of the load current to zener diode 18*f* which would otherwise be supplied completely by amplifier 18*a*. The voltage $+V_{ref}$ developed across resistor 18*e* and zener diode 18*f* with reference to ground is the positive polarity output of reference voltage source 18 and may be utilized alone if the signal input voltage is only of negative polarity. A capacitor 18*g* connected across resistor 18*e* and zener diode 18*f* provides filtering of transients generated when J-FETs 10*a*C and 10*a*D are switched to their conducting states, and may not be required with other type switches.

A resistor 18*h* has one end connected to the juncture of diode 18*d* and resistor 18*e* and the second end connected to a first end of potentiometer 18*i* which is adjusted to obtain equal magnitudes of the positive and negative polarity reference voltages $+V_{ref}$ and $-V_{ref}$. The tap point of potentiometer 18*i* is connected to the negative polarity input terminal of a second operational amplifier 18j which functions as an inverter having a gain of unity. The output of amplifier 18*j* is connected to the second end of potentiometer 18*i* through a resistor 18*l*. The voltage $-V_{ref}$ developed at the output of amplifier 18*j* with reference to ground is the negative polarity output of reference voltage source 18. The output of amplifier 18*j* is also connected through a capacitor 18*m* to ground for filtering the transients in the same manner as filter capacitor 18*g*. A resistor 18*n* is connected from the positive polarity input terminal of amplifier 18*j* to ground for minimizing the effects of bias currents to the input of amplifier 18*j*.

Two separate grounds are utilized in our scaleable digital voltmeter separated by a resistor 18*p* having a low resistance value. The ground connection at the anode of zener diode 18*f* may be described as a small signal ground and is utilized in all of the analog signal circuits, that is, the low side of the voltmeter input signal terminals, the integrator circuit 11 and threshold circuit 12. This first ground is designated ⏚ in the drawings and is the ground at the source location of the voltage being measured. The second ground designated ⏚ is the power and logic ground and is used in the control logic circuit 13, preset counter 14, oscillator 15, display counter 16, and display buffer and display 17, as well as with all of the power supply by-pass capacitors (not shown). Since the first ground is associated with all of the analog signal circuits, the voltage measurements are made with respect to the ground at the source location of voltage measurement, and any change in the power ground system between the local and remote locations of the meter components (especially the remotely located display counter 16 and display 17) will not change the voltage measurement. Our voltmeter operates properly even if the grounds are not interconnected and the zener diode 18*f* current is only flowing through the low resistance resistor 18*p*.

Although it would be desirable to have a reference voltage of exactly 10.0 volts at the output of the reference voltage source 18 correspond to a full scale input signal voltage of exactly 10.0 volts and have the displayed reading at full scale voltage input simply be the pulse count number preset into preset counter 14, practical considerations negative this ideal condition. Temperature stabilized zener diodes are extremely stable at their characteristic voltage, however, the variation of such characteristic voltage from diode to diode is generally ±5 percent. Therefore, if it is desired to have a zener stabilized reference source whose voltage is some exact value, at least a ± 5 percent adjustment in this voltage source is necessary. Such an adjustment is subject to both mechanical and temperature cycling variations and elimination of such a wide range of adjustment is highly desirable. It should be appraent that eliminating the adjustment of the reference voltage can result in a simplified and much more stable voltage reference.

In view of the above considerations, the reference voltage at the output of our reference voltage source 18 is not exactly 10.0 volts and thus the preset counter 14 setting will be slightly different from the desired full scale displayed reading. A plurality of single-pole single-throw switches are used in setting the preset counter 14, and the ease of setting such counter which is afforded by these switches no longer makes it necessary that the reference voltage be exactly 10.0 volts. The reference voltage source 18 thus consists basically of a noniverting circuit including operational amplifier 18*a* which has a highly stable gain of 1.1 (set by the values of resistors 18*b* and 18*c* which are of the high stability type) and an inverter including operational amplifier 18*j* which has a gain of 1.0. If only one polarity reference voltage is required, the inverter circuit including operational amplifier 18*j* is not required. The circuit uses the stable output voltage $+V_{ref}$ as the supply voltage for the reference zener diode 18*f* thereby providing an extremely stable current supply to the zener diode. The zener diode 18*f* voltage is applied to the noninverting side (positive polarity terminal) of operational amplifier 18*a* and since the operational amplifier gain is greater than 1.0, the output voltage thereof supplies the stable current to the zener diode through resistor 18*e*. Diode 18*d* at the output of amplifier 18*a* insures that the amplifier cannot go into negative saturation which could occur if the diode was not utilized. Thus, diode 18*d* insures that operational amplifier 18*a* cannot drive the zener diode 18*f* in the wrong polarity direction. Resistor 18*o* supplies current to force the voltage across zener diode 18*f* in the correct direction independently of operational amplifier 18*a* and thereby insures that diode 18*d* is driven into conduction. Thus, in the case of a 9 volt rated zener diode 18*f*, the output voltage of the reference voltage source provided across resistor 18*e* and zener diode 18*f* with respect to ground ⏚ is $9 \times 1.1 = 9.9$ volts and is a highly stable precision voltage due to the zener voltage stabilizing its own drive current. This output voltage of 9.9 is slightly less than the hereinabove noted full scale input voltage of 10.0 volts and therefore necessitates the slight difference in the preset counter 14 setting for the desired full scale on the voltmeter display as will be described hereinafter with reference to the description of preset counter 14.

Figure 4:
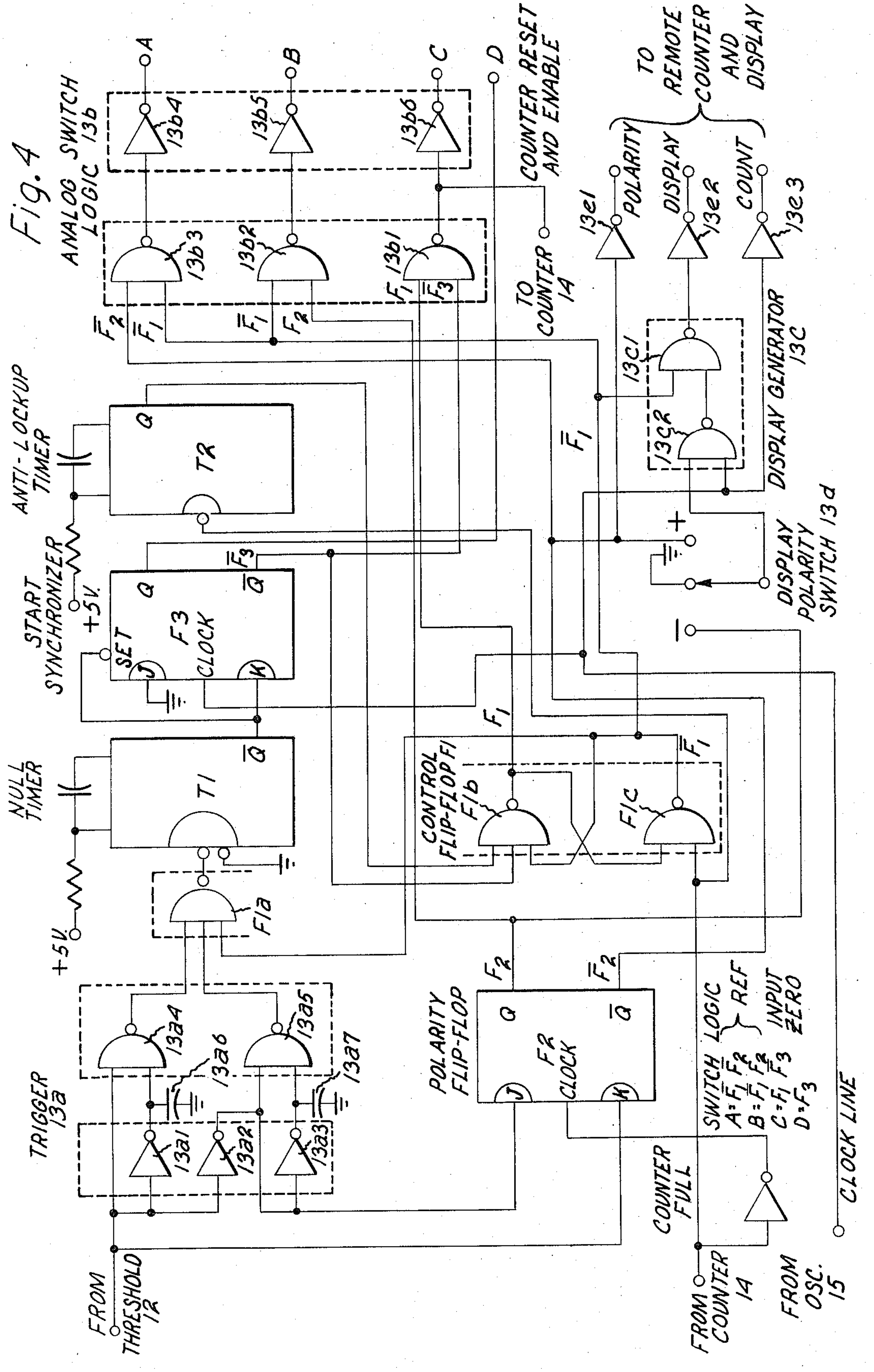
FIG. 4 is a schematic diagram of the control logic circuit shown in block diagram form in FIG. 1.

Referring now to FIG. 4, there is shown in schematic form the control logic circuit 13. As stated hereinabove, the purpose of the control logic circuit is to operate the A, B, C and D switches as well as to enable and reset preset counters 14, enable display counter 16 and also for enabling the display buffer and display 17 such that the final count in the display counter 16 may be transferred thereto. The control logic 13 basically includes a trigger circuit 13*a* which generates a pulse at the time the integrator output voltage passes through zero, a null timer, retriggerable one-shot multivibrator T1, which operates the D switch to enable the nulling (automatic zeroing) circuit around the integrator 11 and at the intergrator input, a control flip-flop F1 which activates input switch 10*a* into its C position state to cause integration of the input signal as well as enabling preset counter 14 to begin its counting operation during the INPUT PERIOD, and a polarity flip-flop F2 which senses the polarity of the input signal and activates reference voltage switch A or B depending on the input signal polarity. After null timer T1 finishes timing the ZERO PERIOD, a start synchronizer flip-flop F3 initiates the INPUT PERIOD in response to the next clock pulse. An anti-lockup timer, retriggerable one-shot multivibrator T2, assures that the correct polarity reference voltage is applied to integrator 11 during the REFERENCE PERIOD even if the polarity flip-flop F2 operates incorrectly, thus insuring proper operation when power is first applied or if electrical interference upsets circuit operation.

Figure 6:
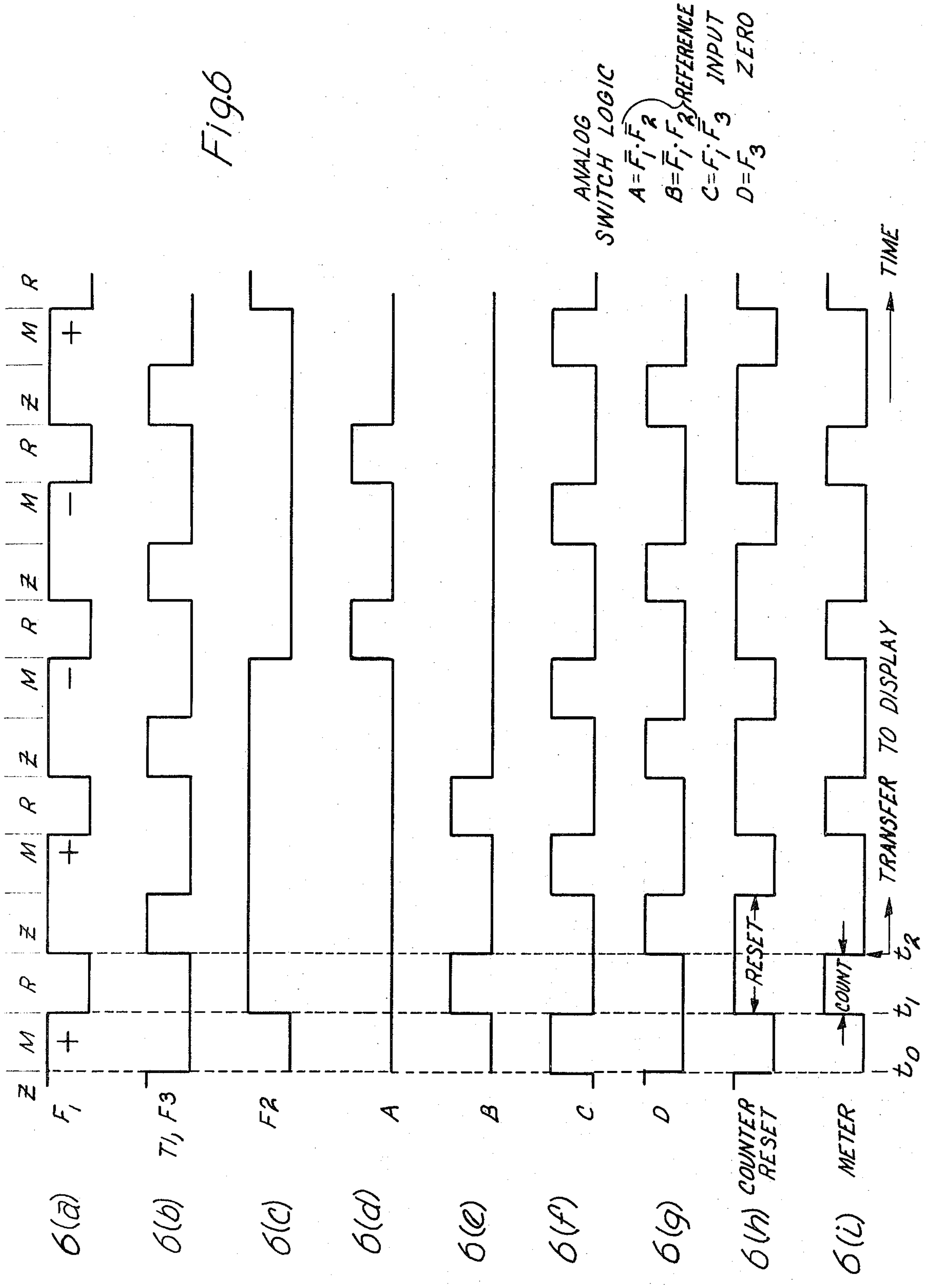
FIG. 6 illustrates the relative timing of waveforms appearing at various points in the control logic circuit.

Referring now to the details of the control logic circuit 13 illustrated in the schematic diagram of FIG. 4, and to the control logic timing waveform diagram of FIG. 6, the trigger circuit 13*a* which triggers the null timer T1 consists of three inverters, two capacitors and two NAND gates. All of the logic components used in the control logic, display and counter circuits may conveniently be of the 74L logic family as one example. Two of the inverters 13*a*1 and 13*a*2 have their inputs connected to the output of threshold circuit 12 (output of comparator 12*e*) and the third inverter, 13*a*3, has its input connected to the output of inverter 13*a*2. The first NAND gate 13*a*4 has a first input connected to the output of threshold circuit 12 and a second input connected to the output of inverter 13*a*1. The second NAND gate 13*a*5 has a first input connected to the output of inverter 13*a*2 and a second input connected to the output of inverter 13*a*3. The second inputs of NAND gates 13*a*4 and 13*a*5 are also connected to grounded capacitors 13*a*6 and 13*a*7, respectively. The two outputs of the trigger circuit 13*a* (outputs of NAND gates 13*a*4 and 13*a*5) are connected to two inputs of one NAND gate F1*a* of a triple three-input NAND gate component which comprises control flip-flop F1. The third input of this first NAND gate F1*a* is connected to the output of the third NAND gate F1*c*. First inputs and outputs of NAND gates F1*b* and F1*c* are cross coupled to form the conventional set-reset flip-flop interconnection and a second input to NAND gate F1*c* is connected to the "counter-full" line from the output of preset counter 14. A second input of NAND gate F1*b* is connected to the $\overline{Q}$ output of start synchronizer flip-flop F3 and a third input is connected to the $\overline{Q}$ output of anti-lockup timer retriggerable one-shot multivibrator T2. The output of NAND gate F1*a* is connected to the trigger input of null timer, one-shot multivibrator T1. The $\overline{Q}$ output of null timer T1 is connected to the direct set and K inputs of start synchronizer flip-flop F3. The clock input of flip-flop F3 is connected to the clock line provided with the clock pulses from oscillator 15. The Q output of flip-flop F3 is connected to the input of the D switches 10*a*D, 11D1, 11D2 and for convenience is indicated as terminal D for interconnection with the two like terminals in FIG. 3. The $\overline{Q}$ output of flip-flop F3 is connected to a second input of NAND gate F1*b*.

The $\overline{F}_3$ output of flip-flop F3 is also connected to a first input of a NAND gate 13*b*1 in the component of the control logic which may be defined as analog switch logic 13*b*. This analog switch logic 13*b* is the logic for determining the operation of input and reference switches A, B and C. The ($\overline{F1}$) output of NAND gate F1*b* in control flip-flop F1 is also connected to a second input of NAND gate 13b1. The ($\overline{F1}$) output of NAND gate F1*c* in control flip-flop F1 is connected to first inputs of NAND gates 13*b*2 and 13*b*3 in analog switch logic 13*b* and is also connected to a first input of a NAND gate 13*c*1 which is part of a display generator circuit 13*c* for transferring the displayed count to the display component. Suitable value resistors and capacitors are connected to the timing inputs of null timer T1 and anti-lockup timer T2 for determining the timing periods thereof. The timing period of anti-lockup timer T2 is greater than the longest normal operating cycle and its period is approximately 10 times that of the null timer timing period. In the analog switch logic 13*b*, the outputs of NAND gates 13*b*3, 13*b*2 and 13*b*1 are connected to inputs of inverters 13*b*4, 13*b*5 and 13*b*6, respectively, the respective outputs thereof being respectively applied to the inputs of switches A, B and C indicated as terminals in FIG. 4 for interconnection with the respective terminals in FIG. 3. Polarity flip-flop F2 has a first input connected to the output of inverter 13*a*2 in the trigger circuit 13*a* and has a second input connected to the output of threshold circuit 12. The clock input to flip-flop F2 is connected to the output of an inverter which has its input connected to the counter-full output of preset counter 14. The Q or F2 output of polarity flip-flop F2 is connected to the second input of NAND gate 13*b*2 in analog switch logic 13*b* and to the negative polarity position of a three position display polarity switch 13*d*. The $\overline{Q}$ or $\overline{F2}$ output of flip-flop F2 is connected to a second input of NAND Gate 13*b*3 in analog switch logic 13*b*, to the positive polarity position of display polarity switch 13*d*, and to the input of an inverter 13*e*1. The logic determined by analog switch logic 13*b* is indicated in the switch logic table in FIG. 4. The output of display polarity switch 13*d* is connected to a first input of NAND gate 13*c*2 in the display generator 13*c* and the second input is connected to the clock line. The output of NAND gate 13*c*2 is connected to the second input of NAND gate 13*c*1 and the output thereof is connected through an inverter 13*e*2 to a conductor having a terminal designated DISPLAY which interconnects the local unit with the remote display counter 16 and buffer and display 17 for enabling such components. The output of inverter 13*e*1 (terminal "POLARITY") if used, interconnects the output of the local unit with the remote display 17 for indicating the polarity of the measured voltage. Finally, the clock line is also connected through an inverter 13*e*3 to a conductor having a terminal "COUNT" for interconnecting the local unit with the remote display counter 16 for transmitting the clock pulses thereto. In many applications it may not be necessary to transmit the polarity signal to the remote unit and therefore only the outputs of inverters 13*e*2 and 13*e*3 are considered essential. The third position of display polarity switch 13*d* is connected to ground in which position both polarities of the measured voltage are transmitted to the remote display. In the negative or positive polarity positions of switch 13*d*, the measured voltage would be transmitted to the remote display only when the measured quantity was of like polarity.

The operation of the control logic 13 as well as the operation of our entire scaleable digital voltmeter can now be described with reference to FIG. 1 for the general components of our voltmeter and with specific reference to FIGS. 3 and 4 for the details of the analog and logic components and with reference to the waveform timing diagram of FIG. 6. The details of the particular preset counter 14 and clock generator oscillator 15 utilized in our voltmeter are illustrated in the schematic diagram of FIG. 5 but are not essential for the purposes of this description.

The measurement cycle begins a time $t_o$ in FIG. 6 when start synchronizer flip-flop F3 is reset (its Q output goes low), see FIG. 6(*b*) by the clock after null timer T1 finishes timing the ZERO PERIOD designated Z in the FIG. 6(*a*) F1 waveform of control flip-flop F1. While timer T1 is timing, its $\overline{Q}$ output is low which direct sets start synchronizer flip-flop F3. When the $\overline{Q}$ output of timer T1 goes high at $t_o$, it arms the K clock gate of flip-flop F3 and the next clock pulse resets F3. While null timer T1 is timing, control flip-flop F1 has been set by the $\overline{Q}$ output of flip-flop F3 which being low, drives control flip-flop output F1 high. The timing waveforms illustrated in FIGS. 6(*b*) and (*c*) refer to the Q outputs of flip-flops F2 and F3 and timer T1 so that the waveform of FIG. 6(*b*) relative to the $\overline{Q}$ output of timer T1 is the inverse of that illustrated. The counter 14 output counter-full line is high during its idle (ZERO PERIOD) state which drives the output of NAND gate F1c, $\overline{F}_1$ low and such condition latches in the $F_1$ output of flip-flop F1 in its high output state. Thus, when flip-flop F3 resets at time $t_o$, the $F_1 \cdot \overline{F}_3$ input to NAND gate 13*b*1 in analog switch logic 13*b* associated with input switch C goes high which drives the counter reset line low as shown in the waveform of FIG. 6(*h*) and also activates the analog input switch C as indicated in the waveform of FIG. 6(*f*) to thereby connect the input signal source to the integrator 11 inputs. Removal of the counter reset enables preset counter 14 to start counting with the next clock pulse. The use of start synchronizer flip-flop F3 to synchronize the starting point of the input (up) integration to the clock pulses eliminates the usual one-count ambiguity that is generally encountered in gated counting systems. Thus, flip-flop F3 is not essential to the operation of our voltmeter, and for this reason an interconnection from oscillator 15 to control logic 13 is not shown in FIG. 1, but its use does provide an advantageous feature. If flip-flop F3 is not utilized, then the analog switch logic for switches C and D becomes $C = F_1 \cdot \overline{T}_1$ and $D = T_1$, the two indicated $\overline{Q}$ outputs of flip-flop F3 are now provided from the $\overline{Q}$ output of null timer T1, and the Q output of flip-flop F3 to the D switch is now provided from the Q output of timer T1.

The up-integrate part of the cycle which is defined as the INPUT or measuring period (designated M) of operation of our scaleable digital voltmeter ends at time $t_1$ when the preset count is reached on counter 14 and in response thereto develops a short duration counter full pulse which is applied to the counter full line in FIG. 4. The counter-full pulse resets control flip-flop F1 to its low state output which disables NAND gate 13*b*1 in the analog switch logic 13*b* and also makes the counter reset line high so as to reset preset counter 14 again. Resetting of counter 14 terminates the output of a gate at the output of counter 14 which senses the preset count being reached so that the low state counter-full pulse is of small duration for approximately 50 nanoseconds as one example which is compared to the clock pulse duration of approximately 2 microseconds. The counter-full pulse, after inversion, also clocks polarity flip-flop F2 (into the high state as seen in FIG. 6(*c*) ) which stores the polarity information supplied by the output of threshold circuit 12.

With control flip-flop F1 reset, the analog switch logic 13*b* causes the inverter output associated with reference switch A or B to go high in accordance with the state of polarity flip-flop F2 as is indicated in the switch logic table of FIGS. 4 and 6, thereby applying reference voltage of the correct polarity fo the down-integration part of the cycle during the REFERENCE PERIOD designated R in FIG. 6. The input signal $V_{in}$ is of positive polarity for the first two cycles illustrated in FIG. 6 and is of negative polarity for the following two cycles as noted by the polarity marks during the INPUT PERIODS (M) of FIG. 6(*a*) and the states of switches A and B in FIGS. 6(*d*) and 6(*e*), respectively. At time $t_2$ when the output of comparator 12*e* switches states in response to the integrator output passing through zero, the NAND gates 13*a*4 and 13*a*5 in the trigger 13*a* circuit generate a pulse regardless of the direction of the transition. This zero-crossing or null pulse triggers null timer one-shot T1 which results in start synchronizer F3 being set (switched to its high state output) and results in the activation of automatic zeroing switch D for initiating the ZERO PERIOD of the cycle in which the input to integrator 11 is grounded, integrator capacitor 11d is disconnected, and the nulling circuit for integrator 11 is enabled. Since null timer T1 is a retriggerable one-shot multivibrator, any trigger pulses which occur after the first, and which often occur during the zeroing action, must be prevented from reaching one-shot T1. This is accomplished by the connection of the $\overline{F}_1$ output of control flip-flop F1 to the trigger input of one-shot T1 by way of NAND gate F1*a*.

Since the control flip-flop F1 is reset only during the down-integration part of the cycle, its $\overline{F}_1$ output is the control gate signal for the remote display and display counter and results in such components being enabled during such time to permit the remote counter (meter) to count as shown in FIG. 6(*i*). With display polarity switch 13*d* in the grounded position, the output of NAND gate 13*c*2 is high, which allows the $\overline{F1}$ output of NAND gate F1*c* to pass through NAND gate 13*c*1 to the DISPLAY output terminal. This enables display of the count on display 17 in the presence of inputs of both polarity. With switch 13d connected to the + or − position, clock pulses are supplied to the DISPLAY LINE, instead of signal $\overline{F1}$, when the polarity flip-flop F2 state is the other polarity resulting in reset of the remote (display) counter 16 before it can count at all. Thus, the display 17 will read zero even though the voltmeter is actually operating normally on this polarity of signal and will only read the measured quantity (final count of display counter 16) when the input signal is of the polarity designated by switch 13*d*. This operating mode is desired in cases such as display of a pressure signal that may go to a vacuum or a valve position signal that may include overtravel past the fully closed position.

The anti-lockup timer one-shot multivibrator T2 is utilized to insure that the polarity flip-flop F2 cannot remain set with the wrong polarity and thereby fail to direct integrator 11 to integrate downward toward zero. This possibility may occur when the power is first applied to the voltmeter. One-shot multivibrator T2 is retriggerable and has a period greater than the longest normal operating cycle and is triggered by the counter-full pulse. In the normal condition, the occurrence of the counter-full pulse keeps the anti-lockup timer T2 in a triggered state with its Q output high and it therefore has no effect on control flip-flop F1. However, if comparator 12e input should fail to pass through zero (as would happen with flip-flop F2 ordering the wrong reference polarity), anti-lockup timer T2 will time out and force control flip-flop F1 to set. Since start synchronizer flip-flop F3 remains reset during this interval, the setting of flip-flop F1 enables analog logic switch NAND gate 13*b*1 and starts a counting cycle on the preset counter 14. Thus, even if integrator 11 is in saturation, anti-lockup timer T2 assures that the correct polarity will become set on polarity flip-flop F2 and the system will recover.

The logic for the display counter 16 and display buffer and display 17 components is not illustrated herein since many conventional types of circuits may be utilized for these functions. As an example of such logic, a NAND gate may be utilized having a first input connected to the DISPLAY line output of FIG. 4 and a second input connected through an inverter to the COUNT line output. This NAND gate is thus a "count" gate since it gates the clock pulses to the remote counter 16, and enables counter 16 to count up from zero while control flip-flop F1 is reset. When F1 sets, the signal on the DISPLAY line goes low, the output of this "count" NAND gate goes low and the remote counter stops counting with the final count remaining held in it. An R-C differentiator circuit in the DISPLAY LINE circuit differentiates the drop in the DISPLAY line signal which results in the count being loaded through the memory gates of the counter to the display buffer and thence transferred to the display as well as resetting the counter in preparation for the next REFERENCE PERIOD. When the DISPLAY line goes to the high state at the beginning of the next count cycle, the memory store signal goes low thereby locking in the previous value of the count.

Figure 5:
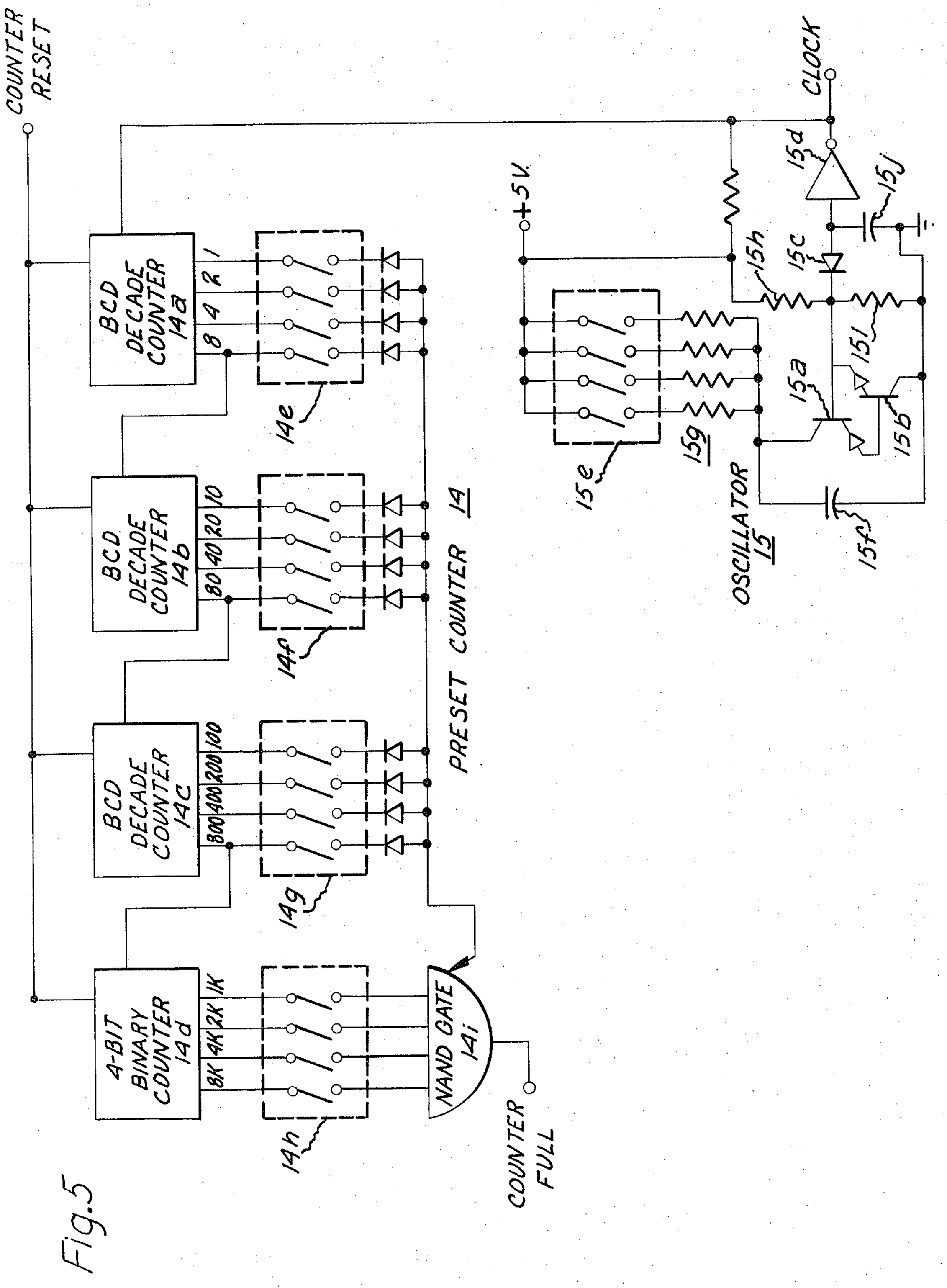
FIG. 5 is a schematic diagram of the preset counter and clock pulse oscillator circuits shown in block diagram form in FIG. 1.

Referring now to FIG. 5, there are shown the details of preset counter 14 and oscillator 15 which functions as the clock generator. Oscillator 15 is a conventional relaxation oscillator comprising a PNP transistor 15*a* which functions with NPN transistor 15*b* as a high speed threshold switch. Operation of the relaxation oscillator is as follows: Capacitor 15*f* connected across the emitter and collector electrodes of transistor 15*a* charges from a +5 volt power supply through the particular resistor(s) 15g selected by switch(es) 15*e* until its voltage becomes greater than the voltage at the juncture of resistors 15*h* and 15*i* which is connected to the base electrode of transistor 15*a* and the emitter of transistor 15*b*. When transistor 15*a* begins to conduct, it causes transistor 15*b* to conduct which lowers the voltage at the base of transistor 15*a* and causes it to conduct more. This feedback action very rapidly discharges capacitor 15*f* whereupon both transistors cease conduction and the process repeats. During the interval that the transistors are conducting, the juncture of resistors 15*h* and 15*i* is driven to zero volts and thereby generates a negative-going pulse thereat of approximately 0.5 microsecond duration. The serially connected diode 15*c* and capacitor 15*j* across resistor 15*i* (and across the collector and emitter of transistor 15*b*) cause a lengthening (stretching) of this negative-going pulse so that after passage through inverter 15*d*, a positive polarity clock pulse of approximately 2.0 microsecond duration results. This longer pulse duration is desirable to simplify transmission of the clock pulses to the remote counter 16. The output of inverter 15*d* thus provides the clock pulses to preset counter 14 and to a terminal designated CLOCK which interconnects with the CLOCK line in the control logic diagram of FIG. 4 and with the clock line input to remote display counter 16. The oscillator frequency does not directly affect the operation of integrator 11, but since the integrator time constant is fixed, the amplitude of the integrator output voltage at full scale DC input is proportional to the preset count. In order to have integrator 11 operate at a more uniform amplitude, the oscillator frequency is made adjustable in 10 percent coded steps be set in correspondence to the most significant figure of the preset count, rounded off for the less significant figures of the count to thereby maintain favorable signal-to-noise ratio on the integrator for all values of the preset count. The oscillator frequency (R-C time constant) adjustment is made by means of the four single-pole single throw switches 15*e* connected in series with four resistors which are scaled in a binary sequence (i.e., the resistors) having resistance values of *k*, 2*k*, 4*k* and 8*k* ohms such that the proper combination of switch closures will provide the desired particular 10 percent change in clock frequency.

Preset counter 14 is a conventional four-decade counter wherein the COUNTER RESET line functions as a gate since the counter clears to zero and cannot count while the reset line is high. Preset counter 14 includes three decade counters 14*a*, 14*b* and 14*c* and a binary counter 14*d*. Four 4-position single-pole single throw switches 14*e*, 14*f*, 14*g* and 14*h* are associated with the data terminals of counters 14*a*, 14*b*, 14*c* and 14*d*, respectively. Switches 14*e-h* as well as switches 15*e* may conveniently each be a single assembly as indicated by the enclosing dashed lines. The other side of switches 14*e*, 14*f* and 14*g* are connected through diodes to a common line connected to an input of a multi-input NAND gate 14*i*. The four outputs of switches 14*h* are connected to four other inputs of coincidence NAND gate 14*i* such that gate 14*i* is effectively a 16-input NAND gate. The setting of switches 14*e-h* determines the preset count which will cause the counter-full pulse to occur. The output of NAND gate 14i is connected to a terminal designated COUNTER FULL which is interconnected with the corresponding COUNTER FULL terminal in the control logic of FIG. 4. The reason for using a binary counter for 14*d* is that the reference voltage source output is fixed due to zener diode 18*f*, and it may sometimes be necessary to have a preset count higher than 9999 which is the highest count achievable using all BCD decade counters. A four bit binary counter is capable of counting to 15 making the highest available count 15,999 with our combination of three decade counters and one binary counter.

Switches 14*e–h* in the preset counter circuit 14 thus provide digital adjustment of full-scale indication on the meter with reference to a standard DC input level. The use of this digital scaling as a digital vernier adjustment eliminates the need for an adjustable reference or for any analog adjustment in the voltmeter. The combination of counters 14*a–d* thus permits all possible counts from zero to 15,999 to be preset by means of the switch connection 14*e–h* from the outputs of the counters to the coincidence gate 14*i*. Since the reference supply voltage is not exactly 10.0 volts, the preset counter 14 has to be adjusted to take this into account and the count set into the preset counter therefore will not equal the desired full scale reading. However, the important point is that both the digital scaling and digital vernier adjustment are obtained by means of switches 14*e–h* and this is not subject to the mechanical problems associated with the use of potentiometer adjustments. And, as stated hereinabove, the ease of setting the preset counter 14 with switches 14*e–h* permits the use of a nonadjustable reference voltage source 18 which is thereby simplified and provides a much more stable voltage than in the case wherein such reference voltage would require an adjustment for the output voltage.

In the procedure for scaling our digital voltmeter, we apply a precise full scale voltage to obtain the desired full-scale reading on the display counter 16. Thus, for the example above, a precise 10.0 volts is applied to the signal input terminal of our voltmeter and switches 14*h* through 14*e* are adjusted to obtain a reading of 3,600 on display counter 16. This value of 3,600 is obtained by beginning with switches 14*h* and closing the switches from left to right until the highest reading below 3,600 has been obtained on display counter 16. Then one proceeds to switches 14*g* in the same manner to obtain a reading below 3,600 but closer thereto, and in the same manner with switches 14*f* and finally 14*e*. In the case of each decade counter it must be appreciated that if the extreme left switch (the most significant digit) is closed, then only the most extreme right switch (least significant digit) may be closed, and not the intermediate one or two switches. As indicated above, the full scale setting of 3,600 on the display counter will result in a slightly different preset counter being set on preset counter 14 when the reference voltage is not exactly the desired full scale voltage of 10.0 volts as in our described embodiment. Thus, no attention should be paid to the numerical significance of switches 14*e–h*. Then, the nearest thousand digit is set on switches 15*e* of oscillator 15, i.e., in the case of 3,600, the nearest thousand digit is 4,000 and therefore a binary 4 is set into switches 15*e*. After the digital voltmeter has been scaled, the negative polarity output of the voltage reference source 18 can be matched to the magnitude of the positive polarity output by adjustment of potentiometer 18*i*. This step is not necessary if only one polarity of the input signal is to be used.

The exclusive use of four-stage binary counters in preset counter 14 (instead of the illustrated four-stage decade counters and four-stage binary counter) may be preferred in many applications of our voltmeter, and is another embodiment of our invention. The advantages of an all-binary preset counter are (1) that only 14 counter stages are needed to obtain the same count obtained by sixteen stages when utilizing the counter illustrated in FIG. 5, and (2) the procedure for scaling our voltmeter is simpler since all switch combinations are possible.

The preset counter 14 can be part decade and part binary as illustrated in FIG. 5 and described hereinabove, or can be all binary as described immediately above, or can be all decade. The display counter 16 can also be part decade and part binary or can be all decade.

From the foregoing description, it can be appreciated that our invention makes available a new digital voltmeter which has the desirable feature of being digitally scaleable by means of simple circuitry such that the voltmeter is of simple construction and much less costly than conventional digital voltmeters which utilize complex circuitry for obtaining the scaling feature. Our meter has a high accuracy and can tolerate a wide change in its temperature environment. An accuracy of better than one part in 10,000 over a temperature range of 0° to 50°C has been noted, and this accuracy was obtained using readily available standard components, and can undoubtedly be further improved by using more expensive components having higher accuracy and stability. The use of a preset counter for determining the meter scaling and a separate counter for the down-integration cycle, the use of digital scaling as a vernier adjustment for the meter, the elimination of the need to adjust the reference voltage, the use of a nulling feedback circuit for automatically zeroing the up-down integrator which thereby avoids the sample-and-hold amplifier conventionally employed to sustain a zero-correcting signal, the provision to suppress the display for reversed polarity and the capability to transmit the meter reading to a remote indicator with minimum complexity and only two conductors (three if the polarity must also be displayed) are considered to be some of the important features and novel aspects of our invention. Since our voltmeter is readily scaleable, it can display the D.C. analog quantities being measured in actual units of such measured quantity such as psi or rpm.

Having described our invention, it is believed obvious that modification and variation of our invention is possible in light of the above teachings. Thus, preset and display counters 14 and 16, respectively, can have greater or lesser capacities than that disclosed herein, and can be all decade or all binary, if desired (but the display counter cannot reasonably be all binary). Further, preset counter 14 can be reset without a specific signal from the control logic 13 as in the case of display counter 16. Obviously, the reference voltage source 18 and oscillator 15 can be of different types than that disclosed herein, and in the case where the reference voltage is exactly equal to the full scale voltage, then the preset count on counter 14 would equal the full scale count on display counter 16. Also, in the case where the display is not to be located remote from the measuring source, the display counter 16 can be omitted, and suitable logic which is conventional can be utilized, for operating counter 14 during both the up and down-integration cycles. The logic would reset the preset counter and enable the display counter function so that counter 14 achieves both functions. Finally, control logic 13 can be comprised of circuits other than illustrated in FIG. 4, the only criterion being that it provide the same functions at the outputs thereof. It is, therefore, to be understood that changes may be made in the particular embodiment of our invention as described which are within the full intended scope of our invention as defined by the following claims.

What we claim as new and desire to secure by letters Patent of the United States is:

1. A scaleable digital voltmeter comprising
an analog integrator,
switch means connected to said integrator for applying to an input of said integrator an input signal having a magnitude proportional to a D.C. analog quantity to be measured by the voltmeter in a first state of said switch means, for removing the input signal and applying a reference voltage to the integrator input from a source of fixed reference voltage of polarity opposite to that of the input signal in a second state of said switch means, and for removing the reference voltage and connecting the integrator input to ground in a third state of said switch means,
threshold means connected to an output of said integrator for detecting the integrator output voltage passing through zero,
control logic means for sequentially initiating the first, second and third ststes of said switch means, said control logic means having a first input connected to an output of said threshold means and a first output connected to said switch means for activation thereof into the first state for initiating a measurement operation of the voltmeter by causing said integrator to integrate in an up direction from zero, an oscillator for generating clock pulses at a constant repetition rate, counter means having a clock input connected to an output of said oscillator for counting the clock pulses when said counter means is in an enabled state, said counter means including at least a first counter device located in the vicinity of a source of the D.C. analog quantity to be measured and on which a count is preset so that during an INPUT PERIOD corresponding to said switch means being in the first state said first counter device counts the clock pulses from zero, the preset count corresponding to full scale on the voltmeter such that the voltmeter is readily digitally scaleable by adjustment of the preset count, said first counter device having an enable input connected to a second output of said control logic means for causing said first counter device to be enabled during the INPUT period for counting the clock pulses, an output of said first counter device connected to a second input of said control logic means for applying a signal thereto substantially simultaneously with the clock pulse count reaching the preset count, said first counter device being reset to zero after reaching the preset count, said control logic means having a third output connected to said switch means for activation thereof into the second state substantially simultaneously with the clock pulse count reaching the preset count, the second state being a REFERENCE PERIOD in which the reference voltage causes said integrator to integrate in a down direction toward zero, said control logic means having a fourth output connected to the enable input of said counter means for causing said counter means to be enabled during the REFERENCE PERIOD for counting the clock pulses, means having a first input connected to a second output of said counter means for displaying the count thereof at the end of the REFERENCE PERIOD, said count displaying means having a second input connected to the fourth output of said control logic means, a signal generated in said threshold means in response to the integrator output voltage passing through zero at the end of the REFERENCE PERIOD initiating a signal at the fourth output of said control logic means which enables said count display means so as to display the count occurring at the end of the REFERENCE PERIOD, the latter count representing the magnitude of the measured quantity, said counter means being reset to zero after the latter count has been transferred to said display means, said control logic means having a fifth output connected to said switch means for activation thereof into the third state substantially simultaneously with the integrator output voltage passing through zero so as to maintain the input of said integrator at zero volts for achieving a ZERO PERIOD of said voltmeter in preparation for a subsequent measurement, and means for presetting the count at which said first counter device stops counting and is reset to zero.

2. The scaleable digital voltmeter set forth in claim 1 wherein said integrator comprises an amplifier including an integrating capacitor connected in a negative feedback circuit thereof, said switch means in the third state thereof disconnecting the integrating capacitor in the feedback circuit precisely when the integrator output voltage goes through zero at the end of the REFERENCE PERIOD.

3. The scaleable digital voltmeter set forth in claim 1 wherein said integrator comprises an amplifier including a first capacitor connected in a negative feedback circuit thereof for producing the integrating function and a second capacitor connected to an input of said integrator, said switch means in the third state thereof connecting said second capacitor in a high gain negative feedback circuit around said integrator for automatically nulling the integrator input during the ZERO PERIOD.

4. The scaleable digital voltmeter set forth in claim 3 and further comprising a high gain amplifier having an input connected to the output of said integrator and a first output connected to said switch means for providing the high gain negative feedback around said integrator during the ZERO PERIOD for the automatic nulling of the integrator input, said high gain amplifier having a second output connected to an input of said threshold means to thereby assure a more precise timing of the instant at which the integrator output voltage passes through zero.

5. The scaleable digital voltmeter set forth in claim 1 wherein said counter means comprises only said first counter device.

6. The scaleable digital voltmeter set forth in claim 5 wherein said first counter device is a plurality of interconnected decade counters.

7. The scaleable digital voltmeter set forth in claim 5 wherein said first counter device is a plurality of interconnected counters some of which are of the decade type and the remaining of the binary type.

8. The scaleable digital voltmeter set forth in claim 1 wherein said counter means further including a second counter device located remote from the measuring source and which counts the clock pulses during the REFERENCE PERIOD, said count display means also being located remote from the measuring source and having the first input thereof connected to an output of said second counter device, and a first conductor interconnecting the output of said oscillator with a clock input of said second counter device and a second conductor for interconnecting the fourth output of said control logic means with an enable input of said second counter device so that only two conductors are required for interconnecting the locally and remotely located components of said voltmeter.

9. The scaleable digital voltmeter set forth in claim 8 wherein said first counter device is a plurality of interconnected decade counters.

10. The scaleable digital voltmeter set forth in claim 8 wherein said first counter device is a plurality of interconnected binary counters.

11. The scaleable digital voltmeter set forth in claim 8 wherein said first counter device is a plurality of interconnected counters some of which are of the decade type and the remaining of the binary type.

12. The scaleable digital voltmeter set forth in claim 8 wherein said second counter device is a plurality of interconnected decade counters.

13. The scaleable digital voltmeter set forth in claim 8 wherein said second counter device is a plurality of interconnected counters some of which are of the decade type and the remaining of the binary type.

14. The scaleable digital voltmeter set forth in claim 1 wherein said switch means in the first state thereof is a first transistor which is switched into conduction from the first output of said control logic means, said first transistor having an input connected to a source of the D.C. analog quantity to be measured and an output connected to the input of said integrator.

15. The scaleable digital voltmeter set forth in claim 1 wherein said switch means in the second state thereof is a second transistor which is switched into conduction from the third output of said control logic means, said second transistor having an input connected to the source of fixed reference voltage and an output connected to the input of said integrator.

16. The scaleable digital voltmeter set forth in claim 1 wherein said switch means in the third state thereof is a third transistor which is switched into conduction from the fifth output of said control logic means, said third transistor having an input connected to ground and an output connected to the input of said integrator.

17. The scaleable digital voltmeter set forth in claim 1 wherein said switch means in the second state thereof comprises a second and fourth transistor wherein the second transistor is switched into conduction from the third output of said control logic means, and the fourth transistor is switched into conduction from a sixth output of said control logic means, said second and fourth transistors being selectively switched into their conductive states in accordance with the polarity of the input signal.

18. The scaleable digital voltmeter set forth in claim 3 wherein said switch means in the third state thereof comprises a third transistor which is switched into conduction from the fifth output of said control logic means, said third transistor having an input connected to ground and an output connected to the input of the integrator, a fifth transistor which is switched into conduction from the fifth output of said control logic means, said fifth transistor having an input connected to a source of bias voltage and an output connected to an input of a low leakage switch connected in the negative feedback circuit of said integrator including said first capacitor, said fifth transistor upon being switched into its conductive state cuasing the low leakage switch to become nonconductive and thereby disconnect the integrating first capacitor from the input of said integrator during the third state of said switch means, and a sixth transistor which is switched into conduction from the fifth output of said control logic means, said sixth transistor having an input connected to the output of said integrator through the high gain negative feedback circuit and an output connected to the second capacitor, said sixth transistor upon being switched into its conductive state connecting the high gain negative feedback circuict around said integrator to said second capacitor for nulling the integrator input to zero during the ZERO PERIOD.

19. The scaleable digital voltmeter set forth in claim 1 wherein said presetting count means comprises a plurality of switches connected to data terminals of said first counter device for establishing the selected preset count and thereby having the voltmeter be readily digitally scaleable by the proper selection of the closed states of the switches.

20. The scaleable digital voltmeter set forth in claim 8 wherein said presetting count means comprises a plurality of switches connected to data terminals of said first counter device to provide the preset count in accordance with the selected closed states of said switches to make the voltmeter be digitally scaleable.

21. The scaleable digital voltmeter set forth in claim 1 wherein said threshold means is a voltage comparator.

22. The scaleable digital voltmeter set forth in claim 1 wherein said control logic means comprises a trigger circuit for generating a pulsed signal at the end of the REFERENCE PERIOD which initiates the signal at the fourth output of said control logic means for enabling said count display means.

23. The scaleable digital voltmeter set forth in claim 22 wherein said control logic means further comprises a first flip-flop which functions as a control flip-flop and comprises first, second and third NAND gates, first and second inputs of the first NAND gate connected to two outputs of said trigger circuit at which are developed the pulsed signal corresponding to the detected integrator output voltage passing through zero in either direction, a third input of said first NAND gate connected to an output of said third NAND gate, output of said first NAND gate connected to a trigger input of a first retriggerable one-shot multivibrator which functions as a null timer, a first output of said first multivibrator being the fifth output of said control logic means for activation of said switch means into the third state substantially simultaneously with the integrator output voltage passing through zero.

24. The scaleable digital voltmeter set forth in claim 23 wherein the second NAND gate has a first input connected to the output of the third NAND gate, a second input connected to a seocnd output of said first multivibrator and a third input connected to an output of a second one-shot multivibrator which functions as an anti-lockup timer, output of the second NAND gate connected to a first input of a fourth NAND gate having an output which after passing through an inverter corresponds to the first output of said control logic means, the second output of said first multivibrator also connected to a second input of said fourth NAND gate, the output of said second NAND gate also connected to a first input of the third NAND gate, a second input of said third NAND gate connected to the first output of said counter means, output of said third NAND gate also connected to a first input of a fifth NAND gate having an output which after passing through an inverter corresponds to the third output of said control logic means, output of said third NAND gate also connected to a first input of a sixth NAND gate having an output which after passing through an inverter corresponds to a sixth output of said control logic means that activates said switch means in the REFERENCE PERIOD to apply a reference voltage to the integrator input of polarity opposite to that obtained with said switch means activated from the third output of said control logic means, an input of said second one-shot multivibrator connected to the output of said first counter device.

25. The scaleable digital voltmeter set forth in claim 24 wherein said control logic means further comprises a second flip-flop for determining and storing the polarity of the input signal and having a first input connected to the output of said threshold means, a second input connected to the output of said first counter device after passing through an inverter, and a third input connected to the output of said threshold means after passing through an inverter, a first output of said second flip-flop connected to a second input of said fifth NAND gate, a second output of said second flip-flop connected to a second input of said sixth NAND gate, the output of said fourth NAND gate corresponding to the second output of said control logic means which enables said first counter device during the INPUT PERIOD.

26. The scaleable digital voltmeter set forth in claim 25 wherein said control logic means further comprises a seventh NAND gate having a first input connected to the output of said third NAND gate, an eighth NAND gate having an output connected to a second input of said seventh NAND gate, said eighth NAND gate having a first input connected to the output of said oscillator and a second input connected to an output of a switch which determines the polarity of the count to be displayed on said display means, said switch having a first input which is grounded, a second input connected to the second output of said second flip-flop and a third input connected to the first output of said second flip-flop, the particular selected closed state position of said switch determining the polarity of the count to be displayed on said display means, the switch closed in the first input position providing both polarities to be displayed, the switch closed in the second input position permitting the count to be displayed only for a positive polarity of the input signal and the switch closed in third input position permitting the count to be displayed only for a negative polarity of the input signal, the output of the seventh NAND gate corresponding to the fourth output of said control logic means connected to a first conductor which interconnects the fourth output of said control logic means with the second input of said count display means, and an output of said oscillator connected to a second conductor interconnecting the output of said oscillator with the clock input of said counter means during the REFERENCE PERIOD such that only two conductors are required for interconnecting said control logic means and said oscillator with said display means and a second counter device that comprises part of said counter means when they are remotely located from the other components of the voltmeter.

27. The scaleable digital voltmeter set forth in claim 24 and further comprising a third flip-flop having a first input connected directly to the second output of said first multivibrator and a second input connected to the output of said oscillator, the third flip-flop functioning to synchronize the start of operation of the digital voltmeter, a first output of said third flip-flop being the fifth output of said control logic means, a second output of said third flip-flop directly connected to the second inputs of said second and fourth NAND gates.

28. A scaleable digital voltmeter comprising switch means for providing an input to the scaleable digital voltmeter and having a first switch adapted to be connected to the output of a source providing an input D.C. voltage signal having a magnitude proportional to a D.C. analog quantity to be measured by the voltmeter, said switch means having a second switch adapted to be connected to a source of fixed reference voltage of polarity opposite to that of the input signal and a third switch adapted to be connected to ground, an integrator having an input connected to an output of said switch means, threshold means connected to an output of said integrator for sensing the integrator output voltage passing through zero and generating a signal in response thereto, control logic means having a first input connected to an output of said threshold means and having a first output in communication with the first switch of said switch means for activation thereof to connect the input signal source to said integrator for initiating operation of the voltmeter and causing said integrator to integrate in a direction wherein the integrator output voltage magnitude increases as a function of the input signal, an oscillator for generating clock pulses at a constant repetition rate, a first counter having a count preset therein corresponding to full scale on the scaleable digital voltmeter to thereby provide a capability for digitally scaling the voltmeter, said first counter having a first input connected to an output of said oscillator and a second input connected to a second output of said control logic means, application of the input signal voltage to said integrator through said first switch causing a first change in signal level at the second output of said control logic means for initiating the counting of the clock pulses in said first counter simultaneously with the application of the input signal, an output of said first counter connected to a seocnd input of said control logic means for applying a signal thereto simultaneously with the clock pulse count reaching the preset count, said control logic means having a third output in communication with the second switch of said switch means for activation thereof to connect the reference voltage source to said integrator for causing said integrator to integrate in an opposite direction wherein the integrator output voltage magnitude decreases toward zero, a second coutner having a first input connected to an output of said oscillator and having a second input connected to a fourth output of said control logic means, application of the reference voltage to said integrator through said second switch causing a first change in signal level at the fourth output of said control logic means for initiating the counting of the clock pulses in said second counter simultaneously with the application of the reference voltage, and means having a first input connected to an output of said second counter for displaying the count thereof, said count displaying means having a second input connected to the fourth output of said control logic means, the signal generated in said threshold means in response to the integrator output voltage passing through zero causing a second change in signal level at the fourth output of said control logic means for enabling said count display means so as to display the count of said second counter occurring when said threshold means detects the integrator output zero, the latter count representing the magnitude of the measured quantity, said control logic means having a fifth output in communication with the third switch of said switch means for activation thereof to connect the input of said integrator to ground so as to maintain the input of said integrator at zero volts for achieving a zero state of said voltmeter in preparation for a subsequent measurement, and means for presetting the count at which said first counter stops counting and is reset to zero.

29. A scaleable digital voltmeter comprising switch means for providing an input to the scaleable digital voltmeter and having a first switch adapted to be connected to the output of a source providng an input D.C. voltage signal having a magnitude proportional to a D.C. analog quantity to be measured by the voltmeter, said switch means having a second switch adapted to be connected to a source of fixed reference voltage of polarity opposite to that of the input signal and a third switch adapted to be connected to ground, an integrator having an input connected to an output of said switch means, threshold means connected to an output of said integrator for sensing the integrator output voltage passing through zero and generating a signal in response thereto, control logic means having a first input connected to an output of said threshold means and having a first output in communication with the first switch of said switch means for activation thereof to connect the input signal source to said integrator for initiating operation of the voltmeter and causing said integrator to integrate in a direction wherein the integrator output voltage magnitude increases as a function of the input signal, an oscillator for generating clock pulses at a constant repetition rate, a first counter having a count preset therein corresponding to full scale on the scaleable digital voltmeter to threeby provide a capability for digitally scaling the voltmeter, the digital scaling also providing a vernier adjustment of the voltmeter, said first counter having a first input connected to an output of said oscillator and a second input connected to a second output of said control logic means, application of the input signal voltage to said integrator through said first switch causing initiation of the counting of the clock pulses in said first counter, an output of said first counter connected to a second input of said control logic means for applying a signal thereto simultaneously with the clock pulse count reaching the preset count, said control logic means having a third output in communication with the second switch of said switch means for activation thereof to connect the reference voltage source to said integrator for causing said integrator to integrate in an opposite direction wherein the integrator output voltage magnitude decreases toward zero, a second counter having a first input connected to an output of said oscillator and having a second input connected to a fourth output of said control logic means, application of the reference voltage to said integrator through said second switch causing initiation of the counting of the clock pulses in said second counter, and means having first input connected to an output of said second counter for displaying the count thereof, said count displaying means having a second input connected to the fourth output of said control logic means, the signal generated in said threshold means in response to the integrator output voltage passing through zero enabling said count display means so as to display the count of said second counter occurring when said threshold means detects the integrator output zero, the latter count representing the magnitude of the measured quantity, said control logic means having a fifth output in communication with the third switch of said switch means for activation thereof to connect thee input of said integrator to ground so as to maintain the input of said integrator at zero volts for achieving a zero state of said voltmeter in preparation for a subsequent measurement, and means for presetting the count at which said first counter stops counting and is reset to zero.

30. The scaleable digital voltmeter set forth in claim 29 and further comprising said control logic means including switch means for suppressing the display of the count on said display means when the polarity of the input signal is opposite of a desired polarity.

* * * * *